United States Patent Office 3,089,890
Patented May 14, 1963

3,089,890
METHOD OF PURIFICATION FOR PHOSPHOROCHLORIDOTHIOATES
John P. Chupp, Kirkwood, and Peter E. Newallis, Crestwood, Mo., assignors to Monsanto Chemical Company, St. Louis, Mo., a corporation of Delaware
No Drawing. Filed May 18, 1960, Ser. No. 29,785
7 Claims. (Cl. 260—461)

This invention relates to phosphorochloridothioates and in particular relates to up-grading (or improving the quality) of commercial phosphorochloridothioates.

Phosphorochloridothioates, that is compounds of the structure

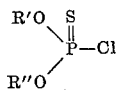

wherein R' and R" are like or unlike hydrocarbon radicals free of non-benzenoid unsaturation (i.e. aryl, alkaryl, cycloalkyl, and alkyl radicals which contain neither olefinic nor acetylenic unsaturation) are of considerable value as intermediates in the manufacture of pesticidal agents, flotation agents, plasticizers, lubricating oil additives, rubber vulcanization accelerators, and many other useful chemicals. For example, the well-known field insecticidal agent O,O-diethyl O-p-nitrophenyl phosphorothioate is obtained upon reacting an alkali metal p-nitrophenate with O,O-diethyl phosphorochloridothioate $[(C_2H_5O)_2PS.Cl]$. Unless otherwise modified R' and R" will have the significance above set forth throughout the following description. Generally, but not necessarily, R' and R" are the same in the foregoing structure.

Various processes are utilized for the production of phosphorochloridothioates of the foregoing structure and commercially they are obtained by chlorinating (preferably in an anhydrous system and either in the presence or absence of an inert organic solvent) either (1) a bis(thiophosphono) sulfide of the structure

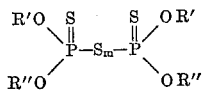

wherein $m$ is a whole number, but usually 2, or (2) a dithiophosphoro compound (which may be the precursor of (1)) of the structure

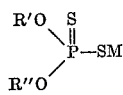

wherein M is hydrogen or an alkali metal (e.g. sodium or potassium) but usually hydrogen, the chlorinating agent being chlorine or sulfur dichloride or sulfur monochloride or sulfuryl chloride, but usually chlorine. Illustrative of the various commercial processes employed are the following wherein M is hydrogen or an alkali metal and wherein X is the grouping

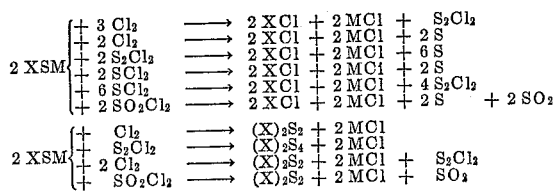

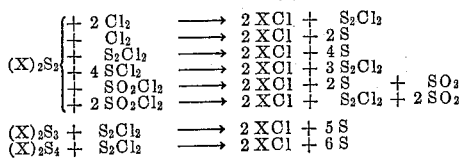

However, these reactions are not so simple as set forth above in that a variety of side reaction products are formed to varying extents depending upon the reaction conditions and the reactants, i.e. the type and amount of chlorinating agent as well as the purity of the thiophosphoro compound subjected to chlorination. In these commercial chlorinating operations upon completion or substantial completion of the chlorination the resulting reaction mass is subjected to direct distillation to remove initially as a low boiling cut or forerun a substantial portion of low boiling materials (i.e. low boiling materials which are characteristic of the particular chlorinating reaction such as hydrogen chloride, sulfur chlorides, hydrocarbon chlorides, alkyl chlorides, inert organic solvent, and the like which boil considerably below (e.g. 25° C. or more below) the boiling point of the desired phosphorochloridothioate) followed by collection of the phosphorochloridothioate as a higher boiling cut by distilling the remainder under reduced pressure. Usually this collected latter distillate will boil in the range of from about (X'−25) ° C. to about (X'+10) ° C. wherein X' is the boiling point in ° C. of the phosphorochloridothioate in the analytically pure state at the particular distilling pressure. In these commercial operations the said collected distilled crude phosphorochloridothioate is usually contaminated with a considerable quantity of impurities or side reaction products some of which satisfy the structure

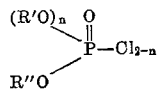

wherein $n$ is an integer from 0 to 1, inclusive, which impurities include one or more compounds having the groupings

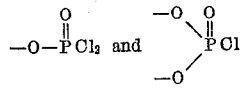

wherein the unsatisfied valences are satisfied by R' and/or R". Heretofore, removal of impurities including the immediately above described non-sulfur containing phosphorus compounds in order to up-grade the collected distilled crude phosphorochloridothioate has been attempted by fractional distillation thereof or solvent extraction thereof with an organic solvent, however, such unit operations have not been found entirely satisfactory from a commercial standpoint because of the close proximity of boiling points and similar solubility characteristics.

The need for improving the quality of the aforedescribed recovered or collected distilled crude phosphorochloridothioate is readily apparent in subsequent processes employing same and in the products derived therefrom. That is to say the efficiency of the processes employed in preparing derivatives thereof is substantially lowered. For example, the impurity

(wherein the unsatisfied valence is satisfied by R' or R"), which is obtained in a substantial amount in the foregoing commercial operations, contains twice as many reactive groups (i.e. chlorine substituents) as the desired phosphorochloridothioate and further like the other chlorine containing impurities such as the aforedescribed having the

grouping provide products having none or substantially none of the properties characterizing that of the corresponding derivative of the phosphorochloridothioate (i.e.

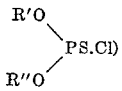

In accordance with this invention there is provided a convenient, inexpensive and efficient method of up-grading or improving the quality of the aforedescribed collected distilled crude phosphorochloridothioates which comprises contacting the said distilled crude phosphorochloridothioate with water and thereafter separating the organic phase. If desired or when necesary the separated organic phase can be subjected to a drying operation employing either heat, or vacuum, or a combination of heat and vacuum, or chemical inorganic dehydrating agents. The temperature of contacting with water can vary widely, e.g. 5° C. to 75° C., but is preferably conducted in the range of from about 10° C. to about 50° C. The time of contacting can also vary depending upon such things as the amount of impurities, the improvement in quality or up-grading desired, the available equipment, the volume of water used and manner of its use, the rate and kind of contacting (e.g. simple shaking, bubbling water up through the organo-material, counter-current or concurrent flow, mechanical agitation, etc.), the temperature of contacting, etc. In other words, the time or duration of contact between the water and the said distilled crude product will be dictated by the designs of the manufacturer, but in general should be as short as required to achieve the desired degree of up-grading. The amount of water employed to up-grade the said distilled crude phosphorochloridothioate will vary widely depending upon such things as the amount of impurities, the improvement in quality or up-grading desired, the available equipment, the rate and kind of contacting (e.g. simple shaking, mechanical agitation, concurrent or countercurrent flow, etc.), the temperature of contacting, the number of contacting stages, etc. In other words, the amount of water employed will be dictated by the designs of the manufacturer, but usually it will be in the range of 0.1 to 10 volumes thereof per volume of said distilled crude phosphorochloridothioate. In a one-stage contact operation 0.25 to 1.25 volumes of water per volume of the said distilled crude phosphorochloridothioate constitute a very satisfactory ratio.

As aforementioned the usual chlorinating agent employed in the preparation of phosphorochloridothioates is chlorine and from a practical standpoint a phosphorodithioic acid (i.e. a compound of the structure

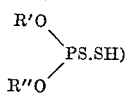

is reacted with chlorine in a molar ratio of approximately 0.9 to 1.6 mols of chlorine per mol of the phosphorothioic acid. On a substantially equimolar basis this particular chlorination reaction can be represented by the following equation:

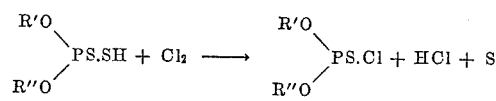

and on a molar ratio of substantially 2:3 (or 1:1.5) this chlorination reaction can be represented by the following equation

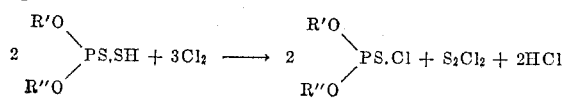

The phosphorodithioic acid reactant above described is prepared in known manner by reacting the appropriate mono-hydroxy substituted hydrocarbon or appropriate mixture thereof with phosphorus pentasulfide in accordance with the equation

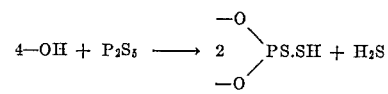

wherein the unsatisfied valences as satisfied by R' and/or R''. The by-product hydrogen sulfide is removed and the crude phosphorodithioic acid directly chlorinated to the phosphorochloridothioate, or the crude phosphorodithioic acid may be further purified by distillation or other means and thereafter chlorinated. The crude phosphorodithioic acid will generally contain more than 80% by weight of phosphorodithioic acid and a small amount of esters of the structures

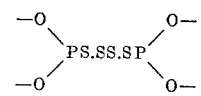

and

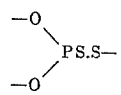

wherein the unsatisfied valences are satisfied by R' and/or R'' together with a relatively small amount of non-acidic impurities. By purification of the crude phosphorodithioic acid, as for example by fractional distillation, the crude acid can be up-graded to 95–100% purity, however, in commercial operations crude acid (i.e. assaying 80% or more) is usually employed in preparing the phosphorochloridothioate. When a crude phosphorodithioic acid containing the aforementioned esters is chlorinated these esters in part are converted to the objectionable non-sulfur containing phosphorus compound

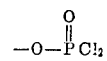

wherein the unsatisfied valence is satisfied by R' or R''. To illustrate such are the following:

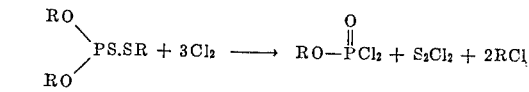

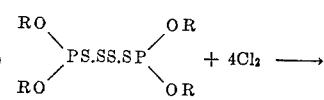

wherein R means R' or R''. Additionally whether or not crude or pure acid is chlorinated the desired phosphorochloridothioate in part reacts with the chlorine as follows:

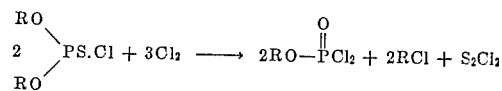

wherein R means R' or R''.

To illustrate the instant invention but not limitative thereof is the following:

EXAMPLE I

A crude O,O-diethyl phosphorochloridothioate is made by adding gaseous chlorine with agitation to a reaction vessel containing 251 parts by weight of O,O-diethyl phosphorodithioic acid [$(C_2H_5O)_2PS.SH$] having a neutralization number of 259 and analyzing 86% $(C_2H_5O)_2PS.SH$ by weight via a gas sparge at the rate of 1.3 parts per minute beneath the surface of the acid until a substantially equimolar amount of chlorine (approximately 81.6 parts by weight) is absorbed. Upon absorption of this amount of chlorine the chlorine addition is stopped and the mass agitated for 15 minutes and then the crude reaction product is placed in a suitable distillation apparatus, distilled by simple take-over distillation by heating up to a pot-temperature of 120° C. at 10 mm. absolute pressure and a cut boiling in the range of 62-81° C. at 10 mm. absolute pressure collected. (The boiling point of analytically pure O,O-diethyl phosphorochloridothioate at 10 mm. absolute pressure is 79±1° C.) This collected distilled crude O,O-diethyl phosphorochloridothioate (analysis in Table I below) is then placed in a glass lined vessel equipped with a mechanical agitator, vent-pipe and thermometer. To this vessel is added an equal volume of 20° C. water and the contents agitated (600 r.p.m.) while maintaining the agitating mixture at 20 to 25° C. While continuously agitating, samples are withdrawn at respective intervals of time of 15 minutes, 30 minutes and 60 minutes. The respective withdrawn samples are permitted to stand for about 5 minutes. The respective aqueous phases are then decanted and the respective organic phases dried over anhydrous sodium sulfate and the respective dried organo-materials analyzed (analysis in Table I below). At the said 60 minute mixing interval, another sample is withdrawn and permitted to stand for about 5 minutes. The aqueous phase is then decanted and the organic phase dried by holding at 45–50° C. at 20–40 mm. absolute pressure for 45 minutes while withdrawing the volatiles overhead and the residue thereafter analyzed (analysis in Table I below). The results employing gas chromatographic analysis in percent by weight are as follows:

EXAMPLE II

A collected distilled crude O,O-diethyl phosphorochloridothioate having a boiling range of 62–82° C. at 10 mm. absolute pressure (analysis in Table II below) is placed in a glass lined vessel equipped with a mechanical agitator, vent-pipe and thermometer. To this vessel is added an equal volume of 20° C. water and the contents agitated (300 r.p.m.) while maintaining the agitating mixture at 20–25° C. While continuously agitating samples are withdrawn at respective intervals of time of 30 minutes and 60 minutes. The respective withdrawn samples are permitted to stand for about 5 minutes. The respective aqueous phases are then decanted and the respective organic phases dried over anhydrous sodium sulfate and the respective dried organo-materials analyzed (analyses in Table II below). At the said 60 minute mixing interval another sample is withdrawn and permitted to stand for about 5 minutes. The aqueous phase is then decanted and the organic phase dried by holding at 45–50° C. at 20–40 mm. absolute pressure for 45 minutes while withdrawing the volatiles overhead and the residue thereafter analyzed (analysis in Table II below). The results employing gas chromatographic analysis in percent by weight are as follows:

*Table II*

| | Residual low boilers | $(C_2H_5O)PO.Cl_2$ | $(C_2H_5O)PS.Cl_2$ | $(C_2H_5O)_2PO.Cl$ | $(C_2H_5O)_2PS.Cl$ | $(C_2H_5O)_3PS$ | $(C_2H_5O)(C_2H_5S)PO.Cl$ | $(C_2H_5O)_2PO.SC_2H_5$ | $(C_2H_5O)_2PS.SC_2H_5$ |
|---|---|---|---|---|---|---|---|---|---|
| Crude distilled $(C_2H_5O)_2PS.Cl$ | 1.16 | 1.03 | 0.13 | 0.04 | 95.04 | 0.10 | 2.18 | 0.11 | 0.21 |
| 30 min. mixing of crude and water, drying over $Na_2SO_4$ | 0.78 | 0.01 | 0.13 | 0.00 | 97.40 | 0.13 | 1.13 | 0.21 | 0.21 |
| 60 min. mixing of crude and water, drying over $Na_2SO_4$ | 0.82 | 0.00 | 0.16 | 0.00 | 98.20 | 0.12 | 0.25 | 0.25 | 0.20 |
| 60 min. mixing of crude and water, drying at 45–50° C./20–40 mm | 0.70 | 0.00 | 0.14 | 0.00 | 98.30 | 0.09 | 0.33 | 0.26 | 0.18 |

EXAMPLE III

A collected distilled crude O,O-diethyl phosphorochloridothioate having a boiling range of 64–80° C. at 10 mm. absolute pressure (analysis in Table III below) is placed in a glass lined vessel equipped with a mechanical agitator, vent-pipe and thermometer. To this vessel is added an equal volume of 20° C. water and the contents agitated (400 r.p.m.) while maintaining the agitating mixture at 20–25° C. While continuously agitating, two samples are withdrawn at the end of 30 minutes. The respective withdrawn samples are permitted to stand for about 5 minutes. The respective aqueous phases are then decanted. One of the separated organic phases is dried over anhydrous sodium sulfate and the dried organo

*Table I*

| | Residual low boilers | $(C_2H_5O)PO.Cl_2$ | $(C_2H_5O)PS.Cl_2$ | $(C_2H_5O)_2PO.Cl$ | $(C_2H_5O)_2PS.Cl$ | $(C_2H_5O)_3PS$ | $(C_2H_5O)(C_2H_5S)PO.Cl$ | $(C_2H_5O)_2PO.SC_2H_5$ | $(C_2H_5O)_2PS.SC_2H_5$ |
|---|---|---|---|---|---|---|---|---|---|
| Crude distilled $(C_2H_5O)_2PS.Cl$ | 0.67 | 2.07 | 0.12 | 0.04 | 93.71 | 0.09 | 3.00 | 0.14 | 0.16 |
| 15 min. mixing of crude and water, drying over $Na_2SO_4$ | 0.50 | 0.01 | 0.13 | 0.00 | 97.28 | 0.11 | 1.55 | 0.19 | 0.23 |
| 30 min. mixing of crude and water, drying over $Na_2SO_4$ | 0.52 | 0.01 | 0.12 | 0.00 | 97.91 | 0.10 | 1.04 | 0.10 | 0.20 |
| 60 min. mixing of crude and water, drying over $Na_2SO_4$ | 0.40 | 0.01 | 0.14 | 0.00 | 98.51 | 0.10 | 0.44 | 0.17 | 0.23 |
| 60 min. mixing of crude and water, drying at 45–50° C./20–40 mm | 0.29 | 0.01 | 0.12 | 0.00 | 98.86 | 0.11 | 0.28 | 0.17 | 0.16 | material analyzed (analysis in Table III below). The other separated organic phase is dried by holding at 50° C. at 10–20 mm. absolute pressure for 30 minutes while withdrawing the volatiles overhead and the residue thereafter analyzed (analysis in Table III below). The results employing gas chromatographic analysis in percent by weight are as follows:

ing an alkali metal salt of 2-isopropyl-4-methyl-6-hydroxy pyramidine with O,O-diethyl phosphorochloridothioate)

Table III

| | Residual low boilers | $(C_2H_5O)PO.Cl_2$ | $(C_2H_5O)PS.Cl_2$ | $(C_2H_5O)_2PO.Cl$ | $(C_2H_5O)_2PS.Cl$ | $(C_2H_5O)_3PS.$ | $(C_2H_5O)\!\!>\!\!P\!O.Cl\,(C_2H_5S)$ | $(C_2H_5O)_2PO.SC_2H_5$ | $(C_2H_5O)_2PS.SC_2H_5$ |
|---|---|---|---|---|---|---|---|---|---|
| Crude distilled $(C_2H_5O)_2PS.Cl$ | 0.56 | 1.17 | 0.09 | 0.05 | 96.32 | 0.29 | 1.17 | 0.10 | 0.25 |
| 30 min. mixing of crude and water, drying over $Na_2SO_4$ | 0.45 | 0.04 | 0.10 | 0.00 | 98.47 | 0.33 | 0.31 | 0.08 | 0.22 |
| 30 min. mixing of crude and water, drying at 50° C./10–20 mm | 0.11 | 0.00 | 0.06 | 0.00 | 99.01 | 0.31 | 0.16 | 0.10 | 0.25 |

It will be observed in the foregoing illustrative examples that a distilled crude phosphorochloridothioate is substantially up-graded with respect to non-sulfur containing phosphorus impurities having chlorine substituents and characterized by the grouping

In addition in the foregoing examples it will be observed that a substantial dividend is realized in the material lowering of the content of an impurity having the grouping

As to the impurities described in the foregoing examples having the respective groupings

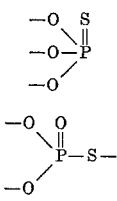

and

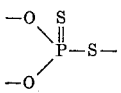

their presence (which generally totals less than one percent by weight) in distilled crude phosphorochloridothioate up-graded in accordance with the process of this invention does not affect the efficiency of subsequent chemical operations involving the said up-graded distilled crude phosphorochloridothioate. It is believed that the presence of these latter three impurities is primarily due to the esters aforedescribed as impurities in the crude phosphorodithioic acid reactant employed to prepare the desired phosphorochloridothioate. With respect to the impurity described in the foregoing examples having the grouping —O—PS.Cl₂ its amount is so insignificant when and if present in a distilled crude phosphorochloridothioate up-graded in accordance with the process of this invention that the efficiency of subsequent chemical operations is not materially affected thereby. In the matter of dividends obtained in employing the up-grading process of this invention another one is particularly observed, that is to say the process of this invention removes or lowers the concentration of odor precursors of the type which adversely effect mono-hydroxy substituted aromatic compound derivatives of phosphorochloridothioates which are employed for household insecticidal purposes. For example the insecticide O,O-diethyl O-(2-isopropyl-4-methyl-pyrimid-6-yl) phosphorothioate which is particularly useful in combatting of household pests such as roaches and flies (it is obtained upon reacting an alkali metal salt of 2-isopropyl-4-methyl-6-hydroxy pyramidine with O,O-diethyl phosphorochloridothioate) when prepared employing a distilled crude O,O-diethyl phosphorochloridothioate up-graded in accordance with the process of this invention is significantly less unpleasant from the standpoint of odor than when prepared employing the same distilled crude O,O-diethyl phosphorochloridothioate but which is not up-graded.

To further illustrate this invention but not limitative thereof substantially equimolar proportions of chlorine and O,O-dimethyl phosphorodithioic acid are brought together and reacted and the distilled crude product up-graded as follows:

EXAMPLE IV

To a suitable reaction vessel equipped with a condenser, agitator and thermometer containing 204 parts by weight of O,O-dimethyl phosphorodithioic acid

[(CH₃O)₂PS.SH]

having a neutralization number of 295 and analyzing 85% (CH₃O)₂PS.SH by weight, is added gaseous chlorine via a gas sparge beneath the surface of the acid at the rate of 1.5 parts by weight per minute while maintaining the reaction mass at 50–60° C. Upon absorption of the theoretical amount of chlorine (approximately 77.5 parts by weight) the addition of chlorine is stopped and the reaction mass agitated for an additional 15 minutes. The crude reaction product so obtained is then placed in a suitable distillation apparatus and without any antecedent chemical treatment distilled by simple takeover distillation by heating up to a pot-temperature of 80° C. and a cut boiling in the range of 45–58° C. at 10 mm. absolute pressure collected. (The boiling point of analytically pure O,O-dimethyl phosphorochloridothioate at 10 mm. absolute pressure is 57±1° C.) Approximately 100 parts by weight (approximately 70 parts by volume) of this collected distilled crude O,O-dimethyl phosphorochloridothioate analyzing (via gas chromatographic analysis) by weight

|  | Percent |
|---|---|
| (CH₃O)₂PS.Cl | 94.6 |
| (CH₃O)PO.Cl₂ | 0.2 |
| (CH₃O)(CH₃S)PO.Cl | 2.7 | is then placed in a glass lined vessel equipped with a mechanical agitator, vent-pipe and thermometer and cooled to 10° C. To this vessel is added 100 parts by weight of 10° C. water and the contents agitated (400 r.p.m.) while maintaining the agitating mixture in the range of 10° C. to 15° C. While continuously agitating a sample is withdrawn at the end of 30 minutes. The withdrawn sample is permitted to stand for about 5 minutes and thereafter the aqueous phase is decanted. The organic phase is then dried over anhydrous magnesium sulfate, the so dried organo-material analyzing (via gas chromatographic analysis) by weight

|  | Percent |
|---|---|
| (CH₃O)₂PS.Cl | 97.9 |
| (CH₃O)PO.Cl₂ | 0.03 |
| (CH₃O)(CH₃S)PO.Cl | 0.31 |

In the up-grading process of this invention it is not necessary to subject the separated organic phase to a drying operation. For example if the separated organic phase is homogeneous it need not be dried and also if it is immediately used in preparing derivatives thereof the presence of water in heterogeneous admixture therewith up to about two or three percent by weight can be tolerated. However, if the separated organic phase is to be stored or shipped it should be dried, preferably under vacuum drying conditions. Alternatively the separated organic phase can be dried over such chemical dehydrating agents as sodium sulfate, calcium chloride, magnesium sulfate, etc., and the like, or dried by passing through a filter bed containing one or more of such chemical dehydrating agents. Obviously the chemical dehydrating agent will contain no substituents which are reactive with the organic phase. On large scale commercial operations it is more convenient to dry the separated organic phase under vacuum drying conditions and it is particularly preferred the pressure be as low as possible (e.g. 2 to 50 mm. absolute pressure). Obviously the temperature employed in such vacuum drying operations will be below the temperature which the phosphorochloridothioate will boil and distill over or will decompose.

The order of bringing together water and the distilled crude phosphorochloridothioate is immaterial in the process of this invention and any means of contacting can be used to realize the objectives of this invention. For example the contacting step can be carried out by batch, semi-continuous or continuous means and in one or more actual contacting stages. In large scale operations it has been found convenient and preferable to employ a packed column (which has alternate open agitated sections and packed sections, e.g. as described in U.S. 2,850,362) in which the distilled crude phosphorochloridothioate is fed to the upper portion of the column, the water fed to the lower portion of the column, and the aqueous phase leaves the top of the column while the organic phase, i.e. up-graded phosphorochloridothioate, leaves the bottom of the column. This counter-current flow drying operation is preferable in that there is a convenient and efficient successive combination of contacting and separating steps.

The up-grading process of this invention is applicable to improving the quality of any distilled crude phosphorochloridothioate of the structure

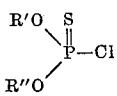

wherein R' and R" are hydrocarbon radicals free of non-benzenoid unsaturation (e.g. phenyl, tolyl, ethylphenyl, benzyl, phenethyl, cyclohexyl, methylcyclohexyl, ethylcyclohexyl, cyclopentyl, methyl, ethyl, propyl, butyl, amyl, hexyl, heptyl, octyl, and the various isomeric forms thereof which are free of olefinic and acetylenic unsaturation). The process of this invention is particularly useful in upgrading distilled crude phosphorochloridothioates of the above structure wherein R' and R" are lower alkyl radicals (i.e. alkyl radicals containing from 1 to 5 carbon atoms such as methyl, ethyl, propyl, butyl, amyl, and the various isomeric forms thereof) and especially wherein R' and R" respectively are ethyl radicals.

By the expression "distilled crude phosphorochloridothioate" (or "distilled crude phosphorochloridothioates") as employed herein and in the appended claims is meant a collected distillate or collected cut boiling in the range of from about (X'−25) ° C. to about (X'+10) ° C., but preferably in the range of from about (X'−20) ° C. to about (X'+5) ° C., wherein X' is the boiling point in ° C. of the phosphorochloridothioate in the analytically pure state at the particular pressure it is distilled from a crude reaction product containing same. With respect to a collected distilled crude O,O-diethyl phosphorochloridothioate such would have a boiling range of from about 53° C. to about 88° C., but preferably 58° C. to 83° C., at 10 mm. absolute pressure. As aforementioned the up-grading process of this invention is applicable to the crude reaction product obtained upon chlorinating (with either chlorine or sulfur monochloride or sulfur-dichloride or sulfuryl chloride, but preferably chlorine) a thiophosphono compound of the structure

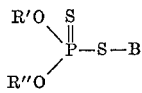

wherein B is an alkali metal (e.g. sodium or potasisum) or the grouping

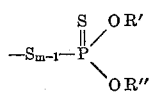

wherein $m$ is a whole number (usually 2) or, and preferably, hydrogen, in the appropriate molar proportions and conditions of which those skilled in the art are fully cognizant. For example employing chlorine and the appropriate phosphorodithioic acid the molar ratio will be in the range of 0.9 to 1.6 mols of the former to one mol of the latter, and preferably the molar ratio will be substantially 1 to 1. While it is preferred and more economical from the standpoint of this invention to directly distill the crude reaction product obtained upon chlorinating a thiophosphono compound as aforedescribed to obtain the "distilled crude phosphorochloridothioate" hereinbefore defined, an intermediary filtration step or other mechanical solid-liquid separation step can be employed to separate any solids in the crude reaction product. However, no particular advantage as far as the process of this invention is concerned is obtained by employing such a mechanical intermediary step, and further such a mechanical operation is usually accompanied by a loss of phosphorochloridothioate due to the nature of the solids (if present), they rather than being true solids are usually plastic semi-solids of a syrupy nature.

It is to be understood that the up-grading process of this invention is not limited or bound by any particular theory regarding the chemical reactions which take place during the water-contacting operation. It is to be further understood that other impurities than those set forth in the illustrative examples can be present in the distilled crude phosphorochloridothioate and removed in the up-grading process of this invention. Whether or not these impurities are present is immaterial to the up-grading process of this invention because the same advantages are obtained whether the impurities are one or more phosphorus containing compounds of the structure

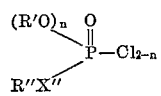

wherein $n$ is an integer from 0 to 1 inclusive and wherein X" is a chalkogen of atomic weight less than 40 (i.e. sulfur or oxygen) or some other additional phosphorus containing contaminant and/or some other non-phosphorus containing contaminant that is removed.

It is to be further understood that while water is the preferred up-grading agent in the process of this invention from the standpoint of efficiency and economy it may contain small amounts, e.g. up to about 5 percent by weight, of such alkaline materials as sodium hydroxide, potassium hydroxide, sodium bicarbonate, sodium carbonate, sodium sulfite, potassium carbonate, etc. However, the usuage of such dilute alkaline aqueous solutions results in a slight lowering of the phosphorochloridothioate content in the up-graded product due to preferential hydrolysis thereof, particularly at higher contacting temperatures.

While this invention has been described with respect to

What is claimed is:

1. The process of up-grading a distilled crude phosphorochloridothioate of the structure $$\begin{array}{c} R'O \\ \phantom{R'O}\diagdown \phantom{P}\overset{S}{\overset{\|}{P}}-Cl \\ R''O \diagup \end{array}$$

contaminated with at least one phosphorus containing compound of the structure $$\begin{array}{c} (R'O)_n \phantom{\diagdown} O \\ \phantom{(R'O)_n}\diagdown \overset{\|}{P}-Cl_{2-n} \\ (R''O) \diagup \end{array}$$

wherein the foregoing $n$ is an integer from 0 to 1, and wherein R' and R" are hydrocarbon radicals having 1 to 8 carbon atoms selected from the group consisting of aryl, alkaryl, aralkyl, cycloalkyl and alkyl radicals which comprises contacting said distilled crude with water and thereafter separating the organic phase from the aqueous phase to recover thereby the said phosphorochloridothioate substantially free of at least one of said phosphorus containing contaminants.

2. The process of up-grading a distilled crude phosphorochloridothioate of the structure $$\begin{array}{c} R' \phantom{\diagdown} S \\ \phantom{R'}\diagdown \overset{\|}{P}-Cl \\ R'' \diagup \end{array}$$

contaminated with at least one phosphorus containing compound of the structure $$\begin{array}{c} (R'O)_n \phantom{\diagdown} O \\ \phantom{(R'O)_n}\diagdown \overset{\|}{P}-Cl_{2-n} \\ (R''O) \diagup \end{array}$$

where in the foregoing $n$ is an integer from 0 to 1, and wherein R' and R" are hydrocarbon radicals having 1 to 8 carbon atoms selected from the group consisting of aryl, alkaryl, aralkyl, cycloalkyl and alkyl radicals which comprises contacting said distilled crude with water and thereafter separating the organic phase from the aqueous phase to recover thereby said phosphorochloridothioate substantially free of at least one of said phosphorus containing contaminants, the said distilled crude phosphorochloridothioate being characterized by a boiling point in the range of from about $(X'-25)$ ° C. to about $(X'+10)$ ° C. wherein X' is the boiling point of the phosphorochloridothioate in the analytically pure state at the particular pressure it is distilled from a crude reaction mass containing same, the said crude reaction mass being that obtained upon reacting a chlorinating agent selected from the group consisting of chlorine, sulfur dichloride, sulfur monochloride and sulfuryl chloride with a thiophosphoro compound of the structure $$\begin{array}{c} R'O \phantom{\diagdown} S \\ \phantom{R'O}\diagdown \overset{\|}{P}-S-B \\ R''O \diagup \end{array}$$

wherein B is selected from the group consisting of hydrogen, alkali metal, and the grouping $$-S_{m-1}-\overset{S}{\overset{\|}{P}}\diagup^{OR'}_{\diagdown OR''}$$

wherein $m$ is a whole number and wherein R' and R" have the aforedescribed significance 3. The process of claim 2 wherein the crude reaction mass is that obtained upon reacting 0.9 to 1.6 mols of chlorine with substantially one mol of a phosphorodithioic acid of the structure $$\begin{array}{c} R'O \phantom{\diagdown} \\ \phantom{R'O}\diagdown PS.SH \\ R''O \diagup \end{array}$$

wherein R" and R' are lower alkyl radicals.

4. The method of improving the quality of a distilled crude phosphorochloridothioate of the structure $$\begin{array}{c} R'O \phantom{\diagdown} S \\ \phantom{R'O}\diagdown \overset{\|}{P}-Cl \\ R''O \diagup \end{array}$$

contaminated with at least one non-sulfur containing phosphorus compound of the structure $$\begin{array}{c} (R'O)_n \phantom{\diagdown} O \\ \phantom{(R'O)_n}\diagdown \overset{\|}{P}-Cl_{2-n} \\ R''O \diagup \end{array}$$

wherein $n$ is an integer from 0 to 1 and wherein R' and R" are lower alkyl radicals, which comprises contacting said distilled crude phosphorochloridothioate with water and thereafter separating the organic phase to recover thereby the said phosphorochloridothioate substantially free of at least one of said non-sulfur containing phosphorus contaminants, the said distilled crude phosphorochloridothioate being characterized by a boiling range of from about $(X'-25)$ ° C. to about $(X'+10)$ ° C. wherein X' is the boiling point of the phosphorochloridothtioate in the analytically pure state in ° C. at the particular pressure it is distilled from a crude reaction mass containing same and being obtained by direct distillation under reduced pressure without any antecedent chemical treatment of a crude reaction mass obtained upon reacting substantially equi-mols of chlorine and a phosphorodithioic acid of the structure $$\begin{array}{c} R'O \phantom{\diagdown} S \\ \phantom{R'O}\diagdown \overset{\|}{P}-SH \\ R''O \diagup \end{array}$$

wherein R' and R" have the aforedescribed significance.

5. The method of improving the quality of a distilled crude phosphorochloridothioate of the structure $$\begin{array}{c} R'O \phantom{\diagdown} S \\ \phantom{R'O}\diagdown \overset{\|}{P}-Cl \\ R''O \diagup \end{array}$$

contaminated with at least one phosphorus containing compound which satisfies the structure $$\begin{array}{c} (R'O)_n \phantom{\diagdown} O \\ \phantom{(R'O)_n}\diagdown \overset{\|}{P}-Cl_{2-n} \\ R''X'' \diagup \end{array}$$

where in the foregoing $n$ is an integer from 0 to 1, inclusive, X" is a chalkogen of atomic weight less than 40, and R' and R" are lower alkyl radicals, which comprises contacting said distilled crude phosphorochloridothioate with water and thereafter separating the organic phase and drying same to recover thereby the phosphorochloridothioate substantially free of at least one of said phosphorus containing contaminants, the said distilled crude phosphorochloridothioate being characterized by a boiling point range of from about $(X'-20)$ ° C. to about $(X'+5)$ ° C. wherein X' is the boiling point in ° C. of the phosphorochloridothioate in the analyltically pure state at the particular pressure it is distilled from a crude reaction mass containing same and being obtained by direct distillation under reduced pressure without any antecedent chemical treatment of a crude reaction mass obtained upon reacting substantially equi-mols of chlorine and a phosphorodithioic acid of the structure $$\begin{array}{c} R'O \phantom{\diagdown} S \\ \phantom{R'O}\diagdown \overset{\|}{P}-SH \\ R''O \diagup \end{array}$$

wherein R' and R" have the aforesaid significance.

6. The process of claim 4 wherein R' and R" are ethyl radicals.

7. The method of improving the quality of distilled crude O,O-diethyl phosphorochloridothioate contaminated with at least one phosphorus containing compound of the structure

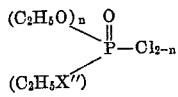

wherein $n$ is an integer from 0 to 1, inclusive and wherein X" is a chalkogen of atomic weight less than 40, which comprises contacting said distilled crude O,O-diethyl phosphorochloridothioate with water, separating the organic phase from the aqueous phase, and thereafter drying the organic phase under vacuum drying conditions to recover thereby O,O-diethyl phosphorochloridothioate substantially free of at least one of said phosphorus containing contaminants, the said distilled crude O,O-diethyl phosphorochloridothioate being characterized by a boiling point range of 58° C. to 83° C. at 10 mm. absolute pressure and being obtained by direct distillation under reduced pressure without any antecedent chemical treatment of the crude reaction mass obtained upon reacting substantially equi-mols of chlorine and O,O-diethyl phosphorodithioic acid.

References Cited in the file of this patent
UNITED STATES PATENTS

| | | |
|---|---|---|
| 1,931,059 | Clemmensen | Oct. 17, 1933 |
| 2,482,063 | Hechenbleikner | Sept. 13, 1949 |
| 2,573,658 | Weesner | Oct. 30, 1951 |
| 2,663,723 | Bland et al. | Dec. 22, 1953 |
| 2,692,893 | Hechenbleikner | Oct. 26, 1954 |

FOREIGN PATENTS

| | | |
|---|---|---|
| 142,539 | Australia | July 30, 1951 |
| 848,791 | Great Britain | Sept. 21, 1960 |